United States Patent [19]

Strache

[11] 4,109,683
[45] Aug. 29, 1978

[54] THROTTLE VALVE

[75] Inventor: Wilhelm Strache, Bremen, Fed. Rep. of Germany

[73] Assignee: Gestra-KSB Vertriebsgesellschaft, Bremen, Fed. Rep. of Germany

[21] Appl. No.: 744,550

[22] Filed: Nov. 24, 1976

[30] Foreign Application Priority Data

Dec. 11, 1975 [DE] Fed. Rep. of Germany ....... 2555752

[51] Int. Cl.² .......................... F16K 47/14; F15D 1/14
[52] U.S. Cl. ............................ 137/625.3; 137/625.37; 251/205; 138/45; 138/43
[58] Field of Search ........................ 137/625.37, 625.3; 251/205, 208; 138/45 A, 43

[56] References Cited

U.S. PATENT DOCUMENTS

| 3,344,894 | 10/1967 | Kenworthy | 137/625.3 X |
| 4,024,891 | 5/1977 | Engel et al. | 137/625.3 |

FOREIGN PATENT DOCUMENTS

| 564,628 | 11/1932 | Fed. Rep. of Germany | 137/625.3 |
| 1,405,850 | 10/1975 | United Kingdom | 137/625.3 |

Primary Examiner—Arnold Rosenthal
Attorney, Agent, or Firm—Allison C. Collard

[57] ABSTRACT

A throttle valve formed from two jackets each having through bores. Each jacket includes two groups of bores, one group of bores being equally spaced from each other and the other group of bores having an intermediate bore unequally spaced from the outer end bores. The jackets are rotatable relatively to each other so as to align the bores for maximum and minimum flow.

9 Claims, 4 Drawing Figures

THROTTLE VALVE

BACKGROUND OF THE INVENTION

This invention relates to throttle valves.

More particularly, the invention is concerned with a throttle valve having a member consisting of at least two telescopically mounted jackets which are provided with radial through flow bores on a plurality of planes for the medium to be throttled, and a slidable locking member to control the throughflow bores, the locking member or the jackets are stroke movably adjustable.

Such throttle valves are advantageous since they can be adjusted by means of a more or less lateral covering of the passage bore at the adjoining range of the jackets. They can be adjusted to different throughflow capacities, i.e., Kv-values by adjusting the jackets during assembly or at a later relative movement of the jackets by means of an adjustment device on the valve. In the practical application, different stroke throughflow quantity characteristic curves may be required depending on the use of the valve, in particular linear and even percentage. The desired characteristic curve path may be realized by a corresponding dimensioning of the throughflow or passage bores. In accordance with the known valve structures (German Pat. No. 11 93 325), this would mean that a different jacket must be used for each curve characteristic and a variation of the characteristic curve during the operation to changes is not possible in any event.

It is, therefore, an object of the present invention to improve the aforementioned throttle valves in that with one jacket unit in addition to the different Kv-values, different stroke throughflow quantity characteristic curves may be realized.

Another object of the present invention is to provide an advantageous manufacturing solution.

SUMMARY OF THE INVENTION

The inventive valve offers, like the known valves, the possibility of providing throughflow bores at the same height, i.e., to arrange groups of bores of both jackets at the same height with respect to each other. Therefore, a defined stroke-throughflow quantity characteristic curve is realized substantially defined by the cross-sectional ratio of the throughflow bores at the different levels. By turning and thereby, a lateral covering of the throughflow bores of both jackets, the Kv-value can be adjusted, as already explained hereinbefore.

When throughflow bores are provided which are offset with respect to each other, then the different height in the individual levels results in a correspondingly different covering of the throughflow openings in the upper or lower range. This results in a ratio which deviates from the cross-sectional ratio of the throughflow bores from the throughflow cross sections which remain open at the adjoining range of the jackets which results in a different characteristic curve. By an additional lateral covering of the throughflow bores which is effected by a corresponding turning of the jackets, the Kv-value is also variable. Hence, with one jacket unit different stroke-throughflow quantity characteristic curves are obtained, and in addition, the possibility exists to vary the Kv-value. By providing a suitable rotating adjustment member or device for the jackets, the Kv-value as well as a change in the characteristic curve can be obtained during the operation of the valve.

A further essential advantageous feature of the present invention consists in that all jackets have an identical arrangement of the bores, and in one position of the jackets relative to each other, the bores coincide. Therefore, the jackets may be provided with bores while in telescoped position of the jackets. Therefore, without any difficulties, an exact positioning of the throughflow bores is realized.

Other subsidiary features are in particular the curved characteristic paths when the throughflow bores are offset with respect to each other. Advantageous manufacturing solutions are provided which enhance the obtaining of a linear characteristic curve.

DETAILED DESCRIPTION OF THE DRAWINGS

Figure 1:
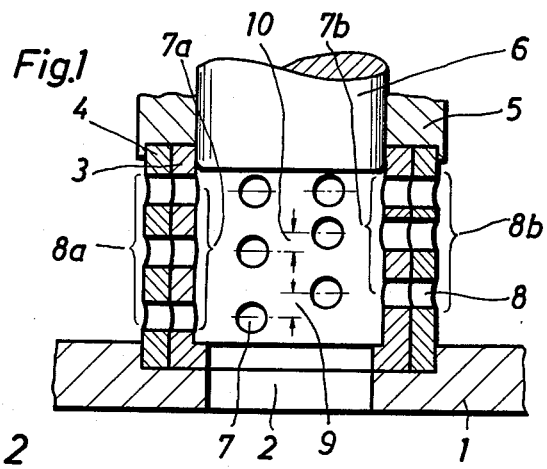
FIG. 1 shows a throttle element of a valve in sectional view having two jackets.

FIG. 1 shows a valve housing having a separating wall 1 between a high and a low pressure side with a connecting opening 2. Concentrically with opening 2, two telescopically mounted coaxial jackets 3 and 4 are provided which are retained in their fixed position by a suitable hold down member 5. A piston-like locking member 6 is stroke movably adjustable in inner jacket 3. Both jackets 3 and 4 are provided with a plurality of radial throughflow bores 7, 8 at various planes of which more or less of the same are released for the throughflow of the medium to be throttled depending on the stroke position of locking member 6. The bores are aligned in lines parallel with the axis of the jackets.

The bore arrangement in both jackets 3 and 4 are identical, and the throughflow bores 7 and 8 are arranged in two different groups, each in lines parallel to each other and the axes of the jackets, 7a, 7b or 8a, 8b, respectively, over each circumferential half of the radial face of jackets 3 and 4. In both groups, the distance between the individual bore planes is different, that is, the distance between the lower bore plane and the intermediate one is larger than the distance between the intermediate one and the upper bore plane. Furthermore, in the lower two planes, the throughflow bores 7 and 8 of the one group 7b or 8b, respectively, with respect to the other group 7a or 8a, respectively, are offset by a dimension which does not exceed the bore diameter. This offset position 9, 10 is larger at the throughflow bores of the lower plane than in the throughflow bore of the intermediate plane. The bores lie in planes parallel to each other and perpendicular to the axis of the jackets. In the upper plane, i.e., when opening the valve by locking member 6, the last released plane, the throughflow openings 7, 8 of all groups 7a, 7b, 8a, 8b are all at the same height.

Figure 2:
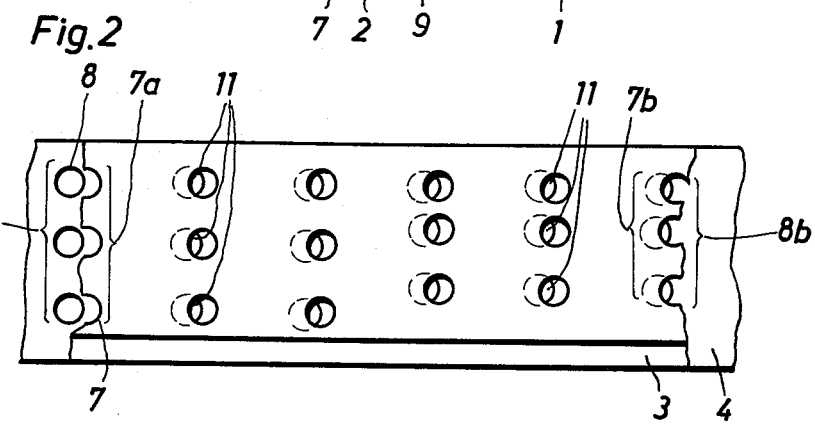
FIG. 2 shows the positioning of the bores of the two jackets of FIG. 1 in a flat plane development with the bores of the two jackets in coincidence with each other.

In this situation, it is possible to synchronize bores 7 of jacket 3 with bore 8 of jacket 4, i.e., the bores of group 7a with the bores of group 8a, and in a similar manner, the bores of group 7b with the ones of group 8b. In view of the uniform cross-section in all of the throughflow bores 7 and 8 of the illustrated embodiment, the free throughflow cross-section 11 available for the medium is evenly large in all bore planes. Thereby, the throttle member shows a substantially linear stroke-throughflow quantity characteristic curve. A change of the Kv-value can be obtained by reducing the free throughflow cross-section 11. For this purpose, a lateral offsetting (FIG. 2) of throughflow bores 7 and 8 with respect to each other has to be carried out by turning jacket 4. No change in the characteristic curve takes place.

Figure 3:
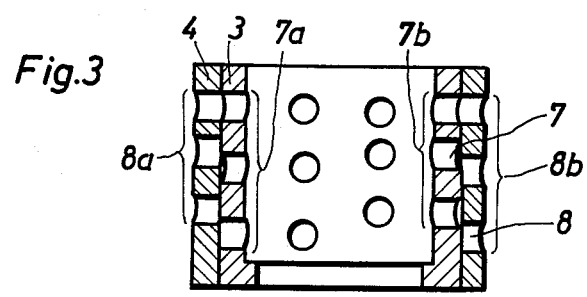
FIG. 3 shows the two jackets of the throttle element of FIG. 1 in which the outer jacket is rotated by about 180° from the FIG. 1 position; and, FIG. 4 shows the positioning of the bores of both jackets of FIG. 3 in a flat plane development with the bores out of coincidence.
Figure 4:
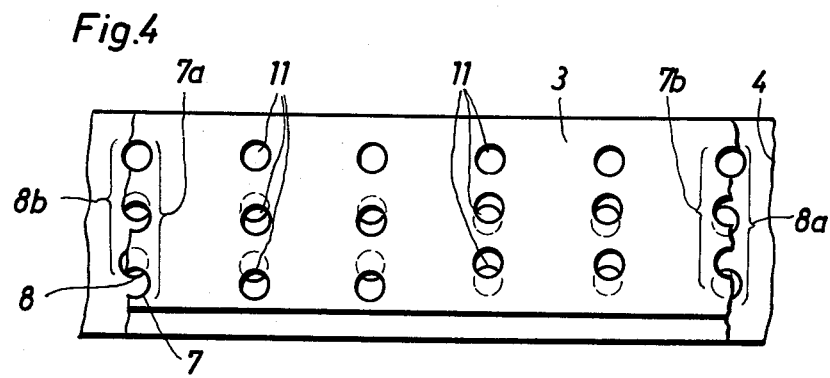

A change in the characteristic curve can be obtained by turning jacket 4 by about 180°. For this purpose, offset bores 7 and 8 are provided, i.e., bores of group 7a are offset with respect to the ones of group 8b, and bores of group 7b are offset with respect to the ones of group 8a (FIGS. 3 and 4). Due to the different offset planes, and differently dimensioned coverings of bores 7 and 8, the combination of openings results in the upper and lower range.

As can be seen from FIG. 4, the free throughflow cross-section 11 increased upwardly from plane to plane. Accordingly, with the same jackets 3 and 4, a different stroke throughflow quantity characteristic curve may be obtained which deviates from the one of FIG. 1, for example, having an even percentage. With an additional turning of jacket 4, and thereby a lateral turning of throughflow bores 7 and 8 with respect to each other, a change of the Kv-value is also obtainable.

It should be noted that the present invention is not restricted to the arrangement of bore groups 7a, 7b, or 8a, 8b, respectively, on only half of the jacket circumference. It is also possible to arrange an even number in larger multiplicity, for example, in alternating series. The use of a piston-like locking member is not necessarily a requirement. Instead, a pipe-like or cap-like locking member which encompasses the outer jacket may be used. Furthermore, the jackets may be stroke movable. The inner jacket could slide on a pipe-like valve seat or the outer jacket could move into a valve seat bore.

While only a single embodiment of the present invention has been shown and described, it will be obvious to those skilled in the art that many changes and modifications may be made thereunto without departing from the spirit and scope of the invention.

What is claimed is:

1. A throttle valve, comprising:
   a throttle member including at least two telescopically and coaxially disposed, substantially cylindrical jackets, each of said jackets having an equivalent number of groups of radially-extending throughflow bores distributed over at least a portion of the circumference thereof, the bores in each group being spaced apart from one another such that their axes lie in spaced apart planes normal to the longitudinal axes of said jackets, at least the axes of some of the bores of one group being offset relative to the axes of corresponding bores of another group in a longitudinal axial direction of said jackets up to a maximum distance equivalent to the cross-section dimensions of said bores, the degree of said offset of corresponding bores of different groups differs from corresponding planes of axes to corresponding planes of axes, said jackets being rotatable relative to another so that, in a first position, the throughflow bores of said one group and said other group of one of said jackets are, respectively, at least partially alignable with the throughflow bores of said one group and said other group of the other of said jackets and, in a second position, the throughflow bores of said one group and said other group of one of said jackets are, respectively, at least partially alignable with the throughflow bores of said other group and said one group of the other of said jackets; and
   a slide-locking portion coaxially disposed relative to said jackets, at least one of said locking portion and said throttle member being longitudinally axially displaceable to permit relative movement therebetween so as to permit opening and closing of said bores.

2. The valve according to claim 1 wherein said groups of bores each comprise a multiplicity of bores including two end bores, one of which is first opened by means of relative displacement between said throttle member and said locking portion and at least one intermediate bore, wherein at least some of said bores offset relative to said corresponding bores of said other group comprise said at least one intermediate bore and said first-opened end bore which are offset relative to the corresponding at least one intermediate bore and said first-opened end bore of said other group, respectively, the degree of offset between said corresponding bores progressively decreasing from the corresponding first-opened bore to at least the corresponding intermediate bores adjacent to the other end bore.

3. The valve according to claim 2 wherein the distance between adjacent planes in which the axes of the said bores of each of said groups lie, progressively decreases from the plane of said first-opened end bore to the plane of the other end bore in each group.

4. The valve according to claim 1 wherein the bores of all groups have the same diameter.

5. The valve according to claim 1 wherein said other end bores of each of said groups, each has an axis which lies in the same plane normal to the axes of said jackets.

6. The valve according to claim 1 wherein said bores on each of said jackets are identically arranged and in one position of said jackets relative to each other, said bores coincide with one another.

7. The valve according to claim 6 additionally including a wall having a connection opening formed therethrough, one end of said jackets being received on said wall concentrically-disposed relative to said opening thereof, and a hold down member engaged with the other end of said jackets for holding said jackets against said wall and wherein said locking member is longitudinally axially displaceable.

8. The valve according to claim 6 wherein said groups of bores each include at least three bores of equal diameter, two ends bores and an intermediate bore aligned in a row parallel to the axes of said jackets, said groups of bores on each of said jackets are arranged in two sets, including a first set of groups of bores in which the end bores of each group are equally spaced from the intermediate bore and a second set of groups of bores in which the end bores of each group are unequally spaced from the intermediate bore, said first set of groups of bores being radially positioned over approximately one-half the circumferential extent of each of said jackets and said other set of said groups being radially positioned over approximately the other half of the circumferential extent of each of said jackets, the axes of the intermediate bores of the said groups in said first set lying in a plane offset from the plane in which the axes of the intermediate bores of the said groups in said second set lie, the distance between said planes of said intermediate bores being no greater than the diameter of said bores.

9. The valve according to claim 6 wherein said groups of bores each include at least three bores of equal diameter, two ends bores and an intermediate bore aligned in a row parallel to the axes of said jackets, said groups of bores on each of said jackets are arranged in two alternating sets, with a group of one set disposed adjacent to a group of the other set, said sets including a first set of groups of bores in which the end bores of each group are equally spaced from the intermediate bore and a second set of groups of bores in which the end bores of each group are unequally spaced from the intermediate bore, said first set of groups of bores being radially positioned over the entire circumferential extent of each of said jackets and said other end of said groups being radially positioned over the entire circumferential extent of each of said jackets, the axes of the intermediate bores of said groups in said first set lying in a plane offset from the plane in which the axes of the intermediate bores of said groups in said second set lie, the distance between said planes of said intermediate bores being no greater than the diameter of said bores.

* * * * *